United States Patent [19]
Wasson

[11] Patent Number: 5,269,593
[45] Date of Patent: Dec. 14, 1993

[54] EMERGENCY AXLE APPARATUS

[76] Inventor: Harvey A. Wasson, Box 56, Perry, Mo. 63462

[21] Appl. No.: 889,844

[22] Filed: May 28, 1992

[51] Int. Cl.$^5$ .............................................. B60B 35/00
[52] U.S. Cl. ................................. 301/130; 301/124.1
[58] Field of Search ................... 301/124.1, 130, 131, 301/128

[56] References Cited

U.S. PATENT DOCUMENTS

| | | | |
|---|---|---|---|
| 809,192 | 1/1906 | Lavers | 301/130 |
| 1,108,690 | 8/1914 | Brewster | 301/130 |
| 1,236,626 | 8/1917 | Trana | 301/130 |
| 1,372,813 | 3/1921 | Helseth | 301/130 |
| 1,380,870 | 6/1921 | Lewis | 301/130 |

Primary Examiner—Russell D. Stormer
Attorney, Agent, or Firm—Leon Gilden

[57] ABSTRACT

An elongate axle beam with an associated first end and intermediate flange members are arranged to support an axle and associated trailer to substitute support for the trailer to accommodate conditions such as a broken axle, spindle, or defective wheel. The axle beam includes a second end flange having a spindle supporting a wheel rotatably thereto.

1 Claim, 4 Drawing Sheets

FIG I

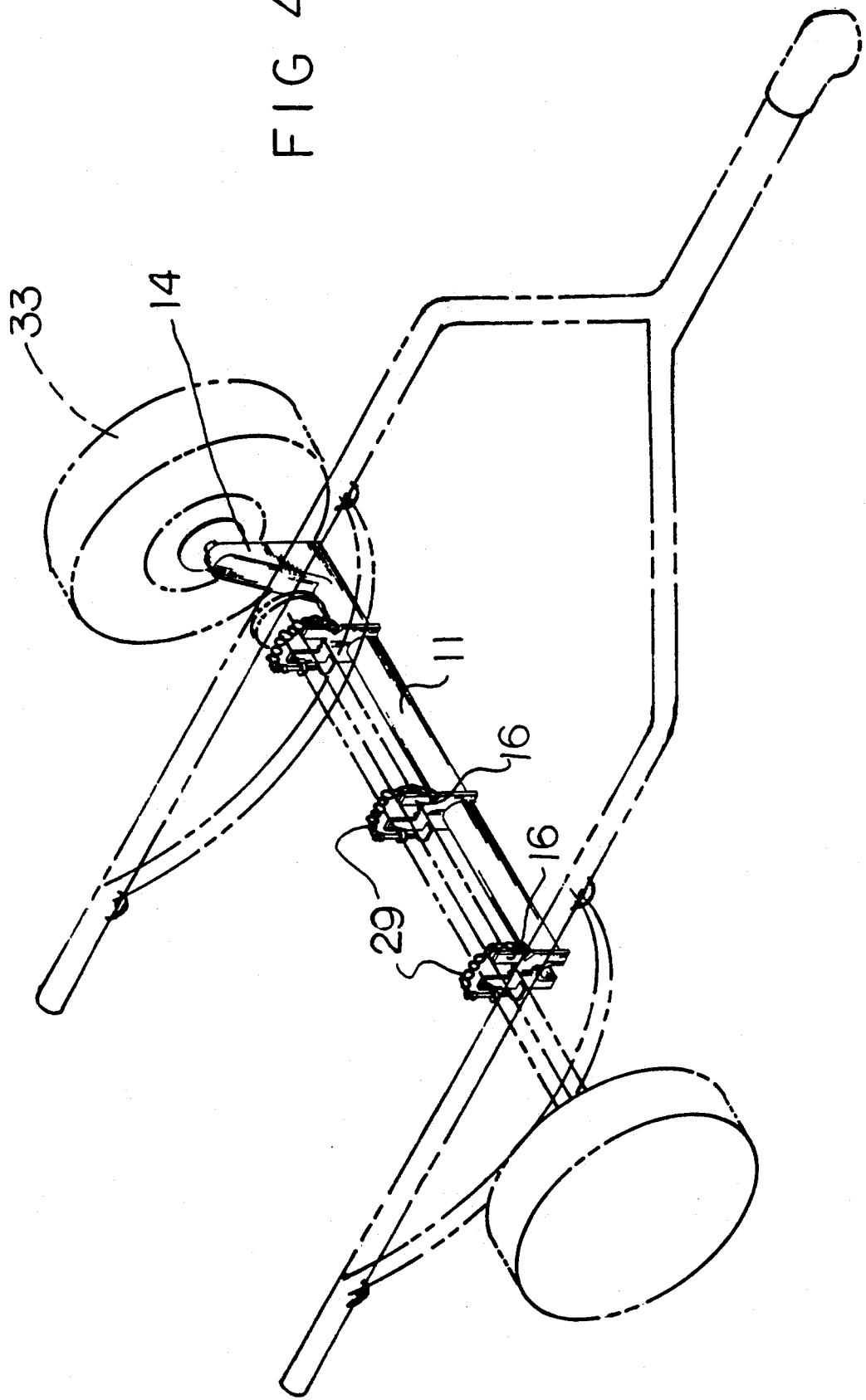

EMERGENCY AXLE APPARATUS

BACKGROUND OF THE INVENTION

1. Field of the Invention

The field of invention relates to trailer apparatus, and more particularly pertains to a new and improved emergency axle apparatus wherein the same is arranged for temporary securement to a trailer for support of the trailer to permit temporary transport thereof.

2. Description of the Prior Art

The breakage and associated breakdown of conventional trailer apparatus, particularly such as boat trailers and the like that are loaded, requires the elaborate and expensive unloading of such trailer structure permitting the transport of the trailer for subsequent repair. The instant invention attempts to overcome deficiencies of the prior art by providing for an axle structure arranged for temporary securement to a trailer to accommodate support and transport of the trailer for subsequent repair.

U.S. Pat. No. 3,995,856 to Ronne; U.S. Pat. No. 4,871,183 to Moss; U.S. Pat. No. 4,087,008 to Silva, Jr.; and U.S. Pat. No. 3,613,921 to Ryden are examples of tow dollies for wheeled vehicles as utilized in the prior art to permit the transport of disabled trailers and the like.

As such, it may be appreciated that there continues to be a need for a new and improved emergency axle apparatus as set forth by the instant invention which addresses both the problems of ease of use as well as effectiveness in construction to accommodate the transport of a trailer structure for repair and in this respect, the present invention substantially fulfills this need.

SUMMARY OF THE INVENTION

In view of the prior art, the present invention provides an emergency axle apparatus wherein the same sets forth an axle structure arranged for the temporary mounting to an existing trailer structure for the transport of the trailer structure for repair.

To attain this, the present invention provides an elongate axle beam with an associated first end and intermediate flange members arranged to support an axle and associated trailer to substitute support for the trailer to accommodate conditions such as a broken axle, spindle, or defective wheel. The axle beam includes a second end flange having a spindle supporting a wheel rotatably thereto.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved emergency axle apparatus which may be easily and efficiently manufactured and marketed.

It is a further object of the present invention to provide a new and improved emergency axle apparatus which is of a durable and reliable construction.

An even further object of the present invention is to provide a new and improved emergency axle apparatus which is susceptible of a low cost of manufacture with regard to both materials and labor, and which accordingly is then susceptible of low prices of sale to the consuming public, thereby making such emergency axle apparatus economically available to the buying public.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of the invention in use.

DESCRIPTION OF THE PREFERRED EMBODIMENT

Figure 1:
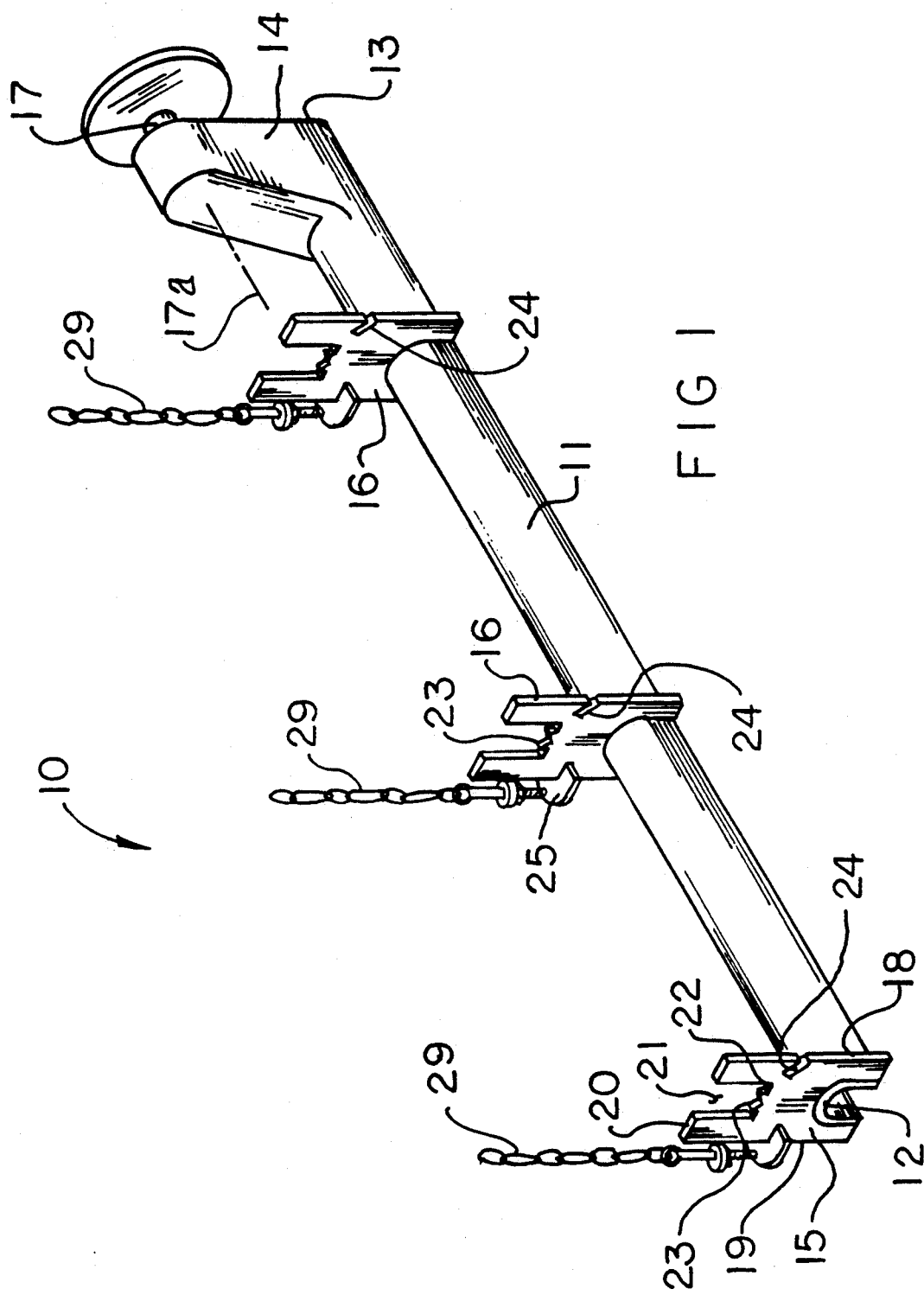
FIG. 1 is an isometric illustration of the instant invention.

With reference now to the drawings, and in particular to FIGS. 1 to 4 thereof, a new and improved emergency axle apparatus embodying the principles and concepts of the present invention and generally designated by the reference numeral 10 will be described.

More specifically, the emergency axle apparatus 10 of the instant invention essentially comprises an elongate axle beam 11 longitudinally aligned, having a first end 12 spaced from a second end 13. A second end flange 14 includes a spindle 17 orthogonally mounted thereto, wherein the spindle is oriented in a parallel spaced relationship relative to the axle beam 11 projecting forwardly of the second end. A first end flange 15 is orthogonally mounted to the axle beam 11 at the first end 12, with a plurality of identical intermediate flanges 16 mounted along the axle beam 11 in a parallel relationship relative to one another. The first end flange 15 and the intermediate flanges 16 are coextensive relative to one another and include a flange first side edge 18 spaced from a flange second side edge 19, with a flange top edge 20. A flange top side edge opening 21 is directed into the flange from the top side edge 20 between the first and second side edges 18 and 19. Each opening 21 includes an opening floor 22 at a lower end of the opening spaced from the top side edge 20. The floor 22 includes a plurality of floor projections 23 arranged to engage in a frictional relationship with an existing trailer axle of a trailer requiring temporary transport, in a manner as illustrated in FIG. 4. The spindle 17 is defined along a spindle axis 17a that is arranged to orthogonally and medially intersect or be arranged below each of the openings 21 to properly orient the spindle 17 in a relationship to align the apparatus 10 in a manner as to minimize tilting of the trailer when the axle beam 11 is mounted to the existing trailer axle, in a manner as illustrated in the FIG. 4.

The first side edge 18 of the first end flange 15 and the intermediate flanges 16 has a first side edge slot 24 that is canted upwardly from the first side edge 18 towards the floor 22, but spaced from the floor 22. The second side edge 19 of each of the flanges 15 and 16 has a second side edge flange 25 orthogonally mounted to the second side edge, with the second side edge flange 25 including an internally threaded bore 26. A threaded adjuster rod 27 is threadedly received within the threaded bore 26, with the threaded adjuster rod having a lock nut mounted thereon to selectively and fixedly secure the adjuster rod 27 relative to the threaded bore 26. A flexible chain 29 is mounted to an upper distal end of the adjuster rod 27, wherein one of the chain links of the flexible chain 29 is received within the associated first side edge slot 24 to permit the looping of the chain 29 of each of the flanges 15 and 16 over a trailer axle in permitting subsequent tightening of the chain about the trailer axle to secure the axle beam 11, in a manner as illustrated in FIG. 4.

Figure 2:
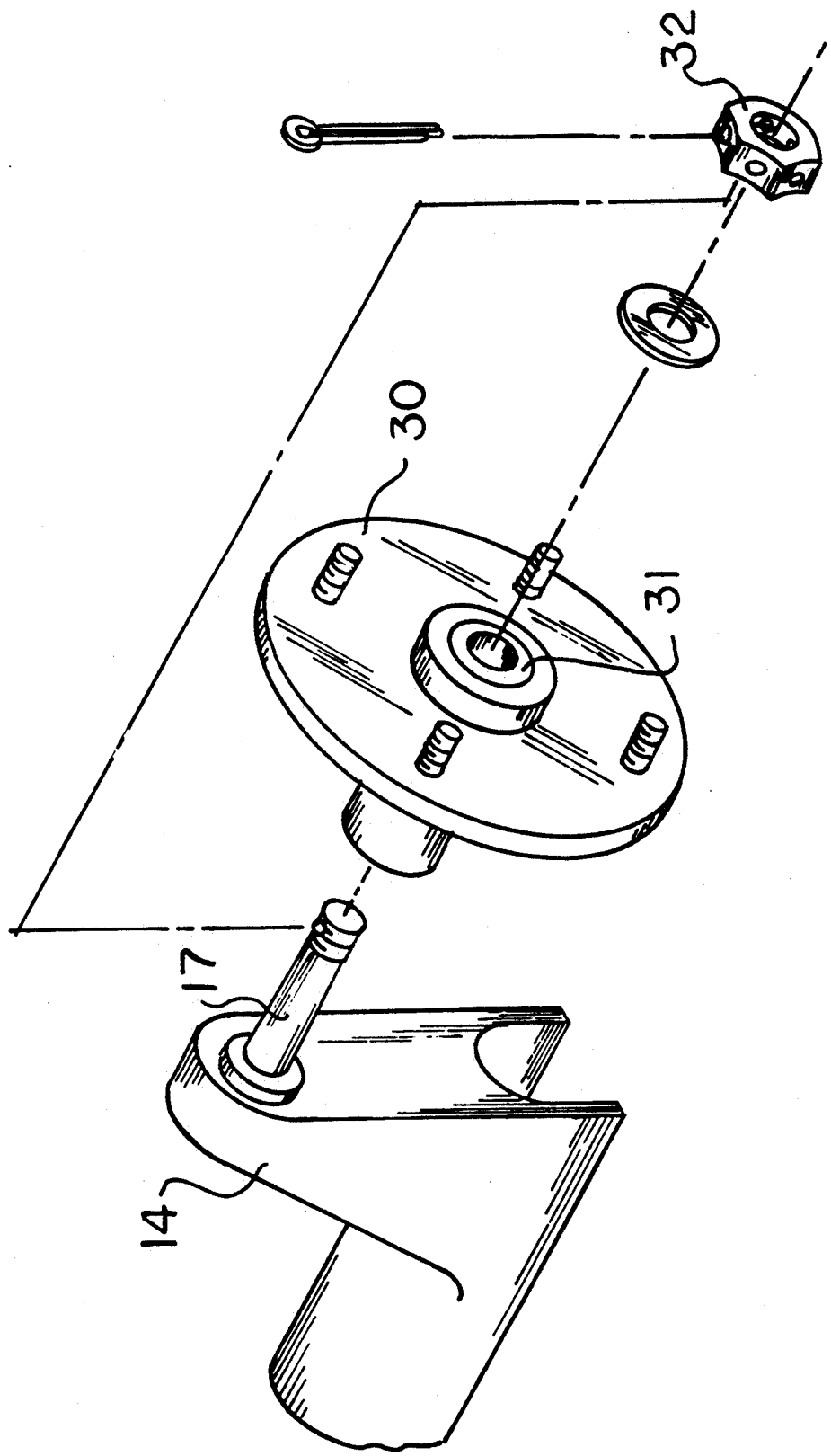
FIG. 2 is an isometric illustration in exploded view of the spindle structure of the invention.
Figure 3:
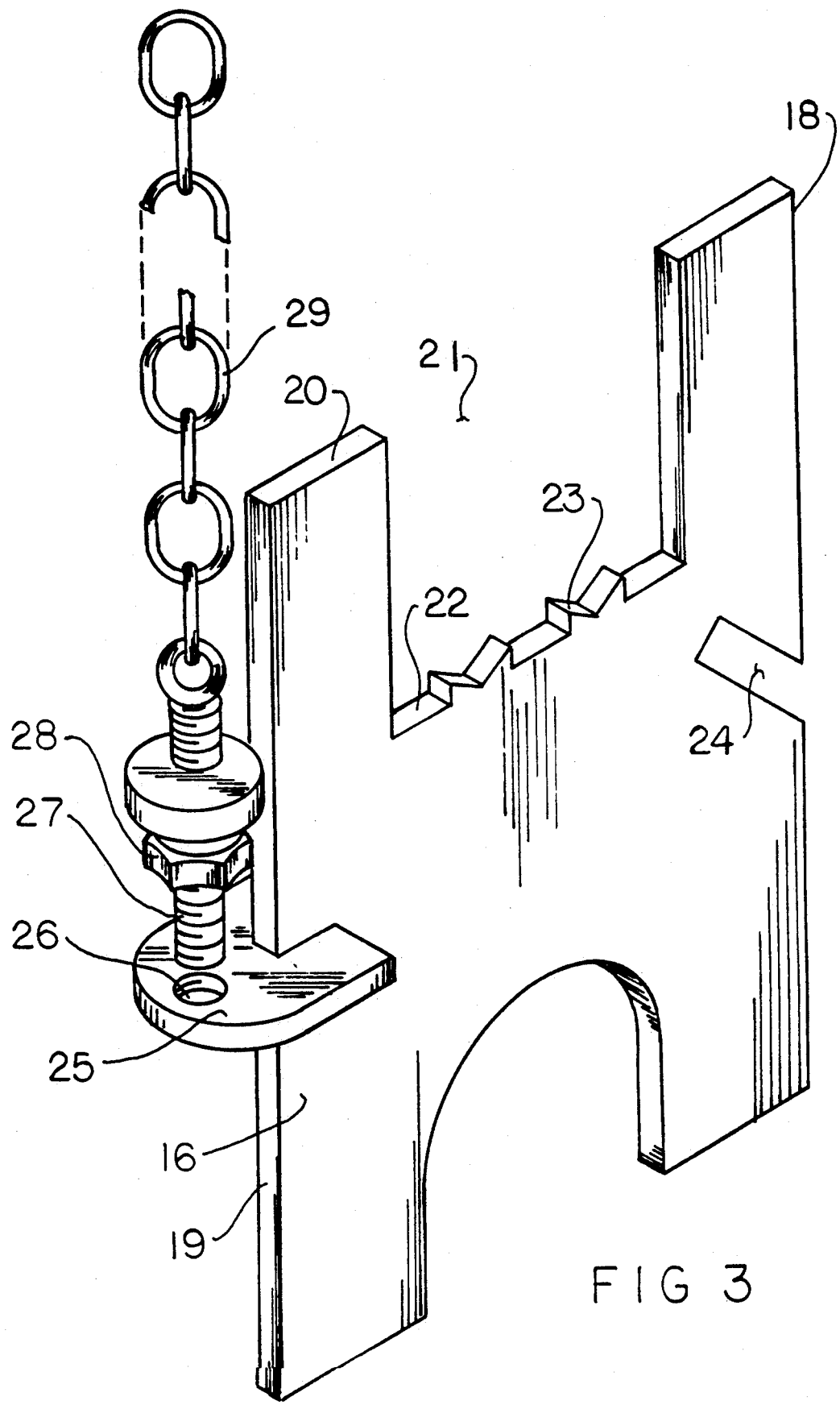
FIG. 3 is an enlarged isometric illustration of a support flange as utilized by the invention.

The FIG. 2 illustrates that the spindle 17 is provided with a spindle flange 30 rotatably mounted about the spindle 17 utilizing a spindle flange bearing 31 receiving the spindle 17 therethrough. A retainer nut 32 is mounted to the spindle to capture the spindle flange relative to the spindle 17. A wheel member 33 is mounted to the spindle flange 30 to provide for rotation of the wheel member 33 for ease of transport of a trailer to be transported.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An emergency axle apparatus arranged for securement to a trailer axle, wherein the emergency axle apparatus comprises, an elongate, longitudinally aligned axle beam having a first end spaced from a second end, and the first end including a first end flange, the second end including a second end flange spaced from and parallel to the first end flange, and at least one intermediate flange mounted along the axle beam in a parallel relationship relative to the first end flange, wherein the first end flange and said at least one intermediate flange are arranged for securement to the trailer axle, and the second end flange includes a spindle, the spindle orthogonally oriented relative to the first end flange and said at least one intermediate flange, with the spindle rotatably mounting a wheel member thereon, and the first end flange and the intermediate flange each include a first side edge spaced from a second side edge, and a top edge, with the first end flange and the intermediate flange including a top edge opening directed into the flange extending from the top edge and oriented between the first side edge and the second side edge, the top edge opening including an opening floor oriented below the top edge, with each opening arranged to receive the trailer axle therewithin, and each opening floor includes a plurality of floor projections arranged to engage the trailer axle, and the spindle is oriented along the spindle axis, the spindle axis orthogonally oriented relative to the first end flange and the said at least one intermediate flange, with the spindle axis intersecting each opening, and each first side edge includes a first side edge slot canted upwardly extending from each first side edge to a spaced relationship below a respective opening floor, and each second side edge includes a second side edge flange, each second side edge flange includes an internally threaded bore, and each internally threaded bore including an externally threaded adjuster rod adjustably directed therethrough, the adjuster rod including a flexible chain secured to the adjuster rod, the flexible chain having a plurality of chain links, and at least one of said chain links is arranged to be received within the first side edge slot of a respective first side edge.

* * * * *